Figure 1:
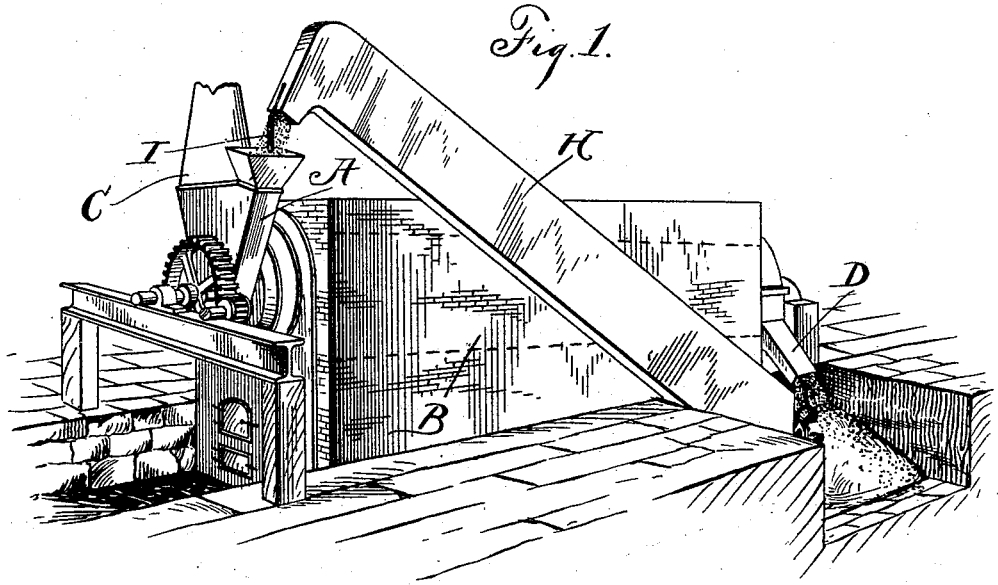

(No Model.)

F. D. CUMMER.
PROCESS OF DRYING AND DISINTEGRATING CLAY, &c.

No. 482,823. Patented Sept. 20, 1892.

UNITED STATES PATENT OFFICE.

FRANKLIN D. CUMMER, OF CLEVELAND, OHIO, ASSIGNOR TO ELIZA E. CUMMER, OF SAME PLACE.

PROCESS OF DRYING AND DISINTEGRATING CLAY, &c.

SPECIFICATION forming part of Letters Patent No. 482,823, dated September 20, 1892.

Application filed July 25, 1891. Serial No. 400,744. (No specimens.)

*To all whom it may concern:*

Be it known that I, FRANKLIN D. CUMMER, of Cleveland, in the county of Cuyahoga and State of Ohio, have invented certain new and useful Improvements in Processes of Drying and Disintegrating Clay, &c.; and I do hereby declare the following to be a full, clear, and exact description of the invention, such as will enable others skilled in the art to which it pertains to make and use the same.

My invention relates to a new process of drying and disintegrating clay and similar material; and it consists in the steps hereinafter described and claimed.

As is well known, the clay for manufacturing porcelain, china, and the finer goods generally is treated in a filter-press; but such treatment is too expensive for manufacturing pressed brick, flower-pots, and other coarser goods, and for such coarser goods it is desirable to dry the clay if it can be done cheaply, because, among other reasons, the clay when dry can be screened to remove small stones and other impurities which could not well be removed by the wet process.

It is generally understood that potters' clay cannot be heated above 250° Fahrenheit without injuring its adhesive qualities, thus rendering it unfit for pressed brick and pottery purposes. On the other hand, the process of drying clay exposed to a temperature less than 250° Fahrenheit would be so slow and expensive that it would usually be considered impracticable. Besides, such slow process would be likely to bake the material into hard masses difficult to reduce so as to be fit for use. I have found means for drying clay quickly and cheaply, and at the end of the process the clay or other material is in condition slaked or disintegrated and mellow, like an ash-heap, and consequently ready for screening or further reduction.

In preparing clay for treatment by my improved process substantially the same means may be employed as in preparing the clay for the wet process, to wit: The clay as it comes from the clay-bank is passed between clay-crushing rollers, where the large stones are removed and the smaller stones are likely broken in passing the rolls. The clay issues from the rolls in the form of a sheet, and this sheet of clay by means of pickers or whippers is preferably broken into small pieces—say the size of the end of a person's finger and smaller. In such condition the clay is subjected to my process, which is as follows: The first stage of the process comprises the roasting of the clay—that is to say, subjecting the clay to a high degree of heat—meantime preferably stirring the clay constantly and thoroughly. The best means that I know of for this purpose is an inclined rotating cylinder, the material being fed into the upper end of the cylinder and being discharged at the other end, the cylinder being provided with such internal ribs, projections, or depressions as will carry up the material with the ascending side of the cylinder and scatter the materials down as evenly as may be across the diameter of the cylinder. The firing is done under the upper end of the cylinder, and the products of combustion after passing rearward along the under section of the cylinder between the side walls of the setting is returned through the cylinder, where it comes in contact with the material. The cylinder may be heated red-hot without injuring the clay, so long as there is any considerable moisture in the clay that is being evaporated, and such escaping vapors will carry off the surplus heat in excess of the evaporating-point—say 212° Fahrenheit. When, however, the clay becomes partially dry, so that but little vapor escapes therefrom, care must be taken not to overheat the clay, and at such point the clay should be discharged from the cylinder, and to this end the cylinder may be revolved slower or faster, and also the clay may be fed slower or faster, for it is evident that if a large amount of clay be passing the cylinder during a given time it will not become heated to so high a degree as if the quantity was small. The object sought is to dry the clay, so far as may be, in the cylinder without injuring it, and at the same time to heat the clay enough so that after it is discharged from the cylinder and placed in piles or bins in large quantities the aggregate heat in the mass will be sufficient to evaporate the remaining moisture and complete the drying process. The heated material after it has been placed in large piles or in bins is left for a time to cool down. The moisture expelled during the cooling-down stage renders the material exceedingly friable, and the slaking or disintegrating of the clay during the cooling stage will leave a large share of the clay mellow, like an ash-pit, ready for screening or for other separation into different grades of fineness suitable for use in making different qualities of ware. In passing the material over screens the small stones and similar impurities are readily removed, and if there should remain some lumps of clay that have not been thoroughly slaked these are easily pulverized by tumbling or other means, so that with little trouble the clay freed from all impurities may be pulverized and made ready for use. In the screening process of course screens of different fineness may be used to assort the material, and if in connection with more especially the fine screens, an air-current be employed to carry off the dust such dust will be found to be substantially as fine as the product from the same material had through a filtering-press.

Another advantage of the dry process conducted as aforesaid is that many impurities found in the clay—such, for instance, as sulphur, arsenic, &c.—are volatilized and thus disposed of in heating or roasting the clay, such volatile matter of course passing off with the vapor from the drying clay.

In the accompanying drawings is shown suitable means for carrying out my improved process, although I do not wish to limit myself to any particular mechanism for the reason that any mechanical drier that will keep the material constantly and thoroughly stirred during the drying process in the machine will answer the purpose.

Figure 2:
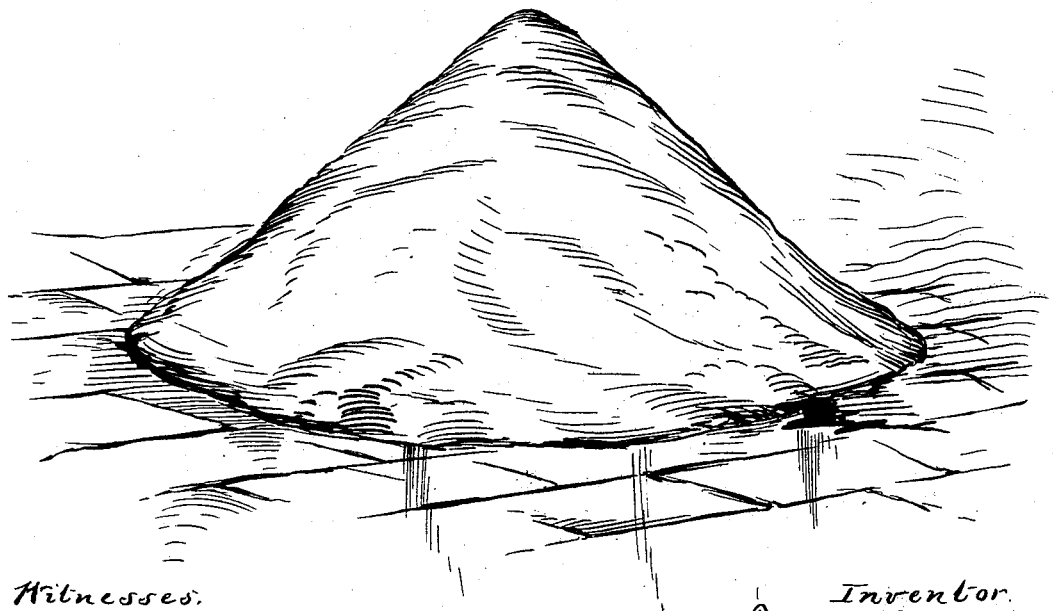

Figure 1 is a view in perspective of a drying apparatus. Fig. 2 is a view in perspective of a pile of material supposed to have been passed through the drier and left for cooling.

The material is fed into hopper or spout A and from thence passes into the inclined rotating cylinder B, the material being discharged at the rear end through spout D. The firing is done under the front end of the cylinder, and the products of combustion pass rearward under the cylinder between the side walls of the setting and from thence return through the cylinder, of course in the opposite direction from that taken by the material, the gases and the vapor from the material passing off through chimney C. I may remark that an application for United States Letters Patent for a drier of this construction has already been made the subject of an application for Letters Patent by me and is now pending in the Patent Office; but, as aforesaid, I do not wish to limit myself in this process to any particular form of drier. After the material is discharged from the roasting or drying apparatus it may be handled by means of any suitable conveying mechanism whereby it can be piled upon the ground or stored in the bin; but as bins are employed for storing the material such bins should be provided with means for ventilation at the sides as well as at the top, so that the vapor escaping from the mass of material can pass off freely. Sometimes the clay or other material is of such a wet sticky nature that it will adhere to the heated cylinder as soon as it comes in contact therewith. In such case I provide a small elevator of some kind—for instance, as at H. This elevator takes up a small quantity of the heated material discharged from spout D and discharges it into hopper A, where it mixes with the raw material and serves the same purpose as sprinkling flour over dough in the culinary department—that is to say, it renders it less sticky; also, there may be placed a thermometer I in such position that it is impinged by the hot material being discharged into the hopper, and by watching this thermometer the operator can tell whether the material discharged from the drier is or is not at the proper temperature and can regulate his fire, feed, &c., accordingly. Where this returning of material to mix with the raw material is not required, I may add that in regard to the precise condition of the partly-dried material where it should be discharged from the machine a little practice will enable a person of intelligence to determine this by observing the amount of vapor passing from the material at or near the point of discharge, and so long as any considerable amount of vapor is seen passing off from the material no fears may be had that the material is being overheated; but when little vapor is seen escaping from the material it may be assumed that there is enough heat in the material to complete the drying after the material has been piled. As a matter of fact, I will state that I find no difficulty in running ten tons of material per hour through a drier, such material being discharged from the drier in such heated and partially-dried condition that the drying is completed in the piles of material, from which it will be understood that my improved process is comparatively cheap.

What I claim is—

1. The process herein described of drying clay and similar material, and consisting, essentially, first, in heating and stirring the material until it is partially dried, and, second, piling the heated and partially-dried material, whereby the drying process is completed by means of the aggregate heat in the pile of material, substantially as set forth.

2. The process herein described of drying clay and similar materials, comprising, first, heating, stirring, and partially drying the material in any suitable mechanical drier; second, returning a portion of the heated material and mixing it with the green material to be heated, and, third, piling the heated and partially-dried material to evaporate the same to dryness by means of the accumulated heat in such pile of material, substantially as set forth.

In testimony whereof I sign this specification, in the presence of two witnesses, this 22d day of June, 1891.

FRANKLIN D. CUMMER.

Witnesses:
C. H. DORER,
WARD HOOVER.